US006391927B1

(12) United States Patent
Ogura et al.

(10) Patent No.: US 6,391,927 B1
(45) Date of Patent: May 21, 2002

(54) METHOD FOR MANUFACTURING INK FOLLOWER FOR WATER BASE BALLPOINT PENS

(75) Inventors: Norio Ogura; Youji Takeuchi; Kiyoshi Iwamoto; Tadashi Kamagata; Katsuhiko Shiraishi, all of Yokohama (JP)

(73) Assignee: Mitsubishi Pencil Kabushikikaisha, Tokyo (JP)

( * ) Notice: Subject to any disclaimer, the term of this patent is extended or adjusted under 35 U.S.C. 154(b) by 0 days.

(21) Appl. No.: 09/463,749

(22) PCT Filed: Jul. 31, 1998

(86) PCT No.: PCT/JP98/03433

§ 371 Date: Apr. 7, 2000

§ 102(e) Date: Apr. 7, 2000

(87) PCT Pub. No.: WO99/06224

PCT Pub. Date: Feb. 11, 1999

(30) Foreign Application Priority Data

Jul. 31, 1997 (JP) ............................................. 9-206228

(51) Int. Cl.[7] .......................... B01J 13/00; B01D 19/00; B43K 7/08

(52) U.S. Cl. ....................... 516/100; 137/205; 401/217; 422/43; 516/99; 516/101; 516/924; 516/928

(58) Field of Search .......................... 516/99, 100, 101, 516/924, 928; 422/43; 137/205; 401/217

(56) References Cited

U.S. PATENT DOCUMENTS

| | | | | | |
|---|---|---|---|---|---|
| 2,502,102 | A | * | 3/1950 | Peters | 137/205 X |
| 2,732,829 | A | * | 1/1956 | Fehling | 401/217 |
| 4,695,402 | A | * | 9/1987 | Finlayson et al. | 516/100 X |
| 5,075,033 | A | * | 12/1991 | Cody et al. | 516/100 X |
| 6,010,269 | A | * | 1/2000 | Yokosuka et al. | 401/217 |

FOREIGN PATENT DOCUMENTS

| | | |
|---|---|---|
| JP | 5-270192 | 10/1993 |
| JP | 6-33024 B2 | 5/1994 |
| JP | 6-33025 B2 | 5/1994 |
| JP | 7-61187 | 3/1995 |
| JP | 9-123606 A | 5/1997 |

* cited by examiner

*Primary Examiner*—Richard D. Lovering
(74) *Attorney, Agent, or Firm*—Kubovcik & Kubovcik

(57) ABSTRACT

Dispersibility of thickener is constant for every lot and viscosity difference is little. Fine bubbles existing in the thicker in ink follower are removed. A step of homogenizing the thickener at any temperature within a range of 40° C. to 130° C. is included. Preferably, a step of homogenizing the thickener at any temperature within a range of 100° C. to 130° C. is included.

4 Claims, 1 Drawing Sheet

METHOD FOR MANUFACTURING INK FOLLOWER FOR WATER BASE BALLPOINT PENS

This application is a 371 of PCT/JP98/03433 filed Jul. 31, 1998.

TECHNICAL FIELD

The present invention relates to a method for manufacturing ink follower, which follows water-base ink filled in an ink reservoir of a ballpoint pen.

BACKGROUND ART

The ink for a water-base ballpoint pen has a viscosity of as low as 50 mPa sec to 3 Pa sec, while the ink for an oil-base ballpoint pen, though it has a similar structure to a water-base one, has a viscosity of 3 to 20 Pa sec. Consequently, the ink filled in a water-base ballpoint pen may leak out when the pen is left upward or sideways. Moreover, even a small impact made on the pen may cause its ink to scatter and to stain the hand or the clothes.

There have been conventional arts for a water-base ballpoint pen with its ink in its ink reservoir that it is equipped with an ink follower composed of a gelled material, or a mixture of the gelled material and solid material.

The aims of the arts are to make the ink follower follow the ink smoothly, to make the pen endure the impact when dropped, to prevent the ink from back flow, to give the pen a good appearance, and so on.

A common feature of such arts is that the ink follower, which has pseudo-plasticity, is made from hardly-volatile or non-volatile solvent which is supplemented with some kind of thickener in order that the ink follower may not flow backward when the pen is left sideways or upward.

Moreover, conventional ink follower for water-base ballpoint pens often has very low viscosity and tenacity, as compared with that for conventional oil-base ballpoint pens, which often has equal viscosity to common grease used for lubricant. That is because of making the following property to the ink better.

Amount of the ink of a ballpoint pen necessary for writing varies depending upon the diameter of the ball. In an oil-base ballpoint pen for fine (0.5 mm) to bold (1.0 mm) letters, the amount is 10–30 mg per 100 m. On the other hand, in a water-base ballpoint pen for fine (0.3 mm) to bold (0.7 mm) letters, the amount is 50–300 mg per 100 m. Since the amount of the ink consumed for a water-base ballpoint pen is more than five- to ten-fold of that for an oil-base ballpoint pen, severe ink-following properties are requested for the ink follower for a water-base ballpoint pen. Thus the follower having low viscosity and tenacity has been used as compared with that for an oil-base ballpoint pen.

Lubricant grease with low viscosity and consistency generally has such low stability that oily matter likely separates when left to stand. In addition, if the thickener component in the lubricant grease is likely to move, it causes the grease to lose homogeneity easily by forming a mixture of coarse and dense portions. The lower the viscosity of the thickener of the grease, the less effectively the thickener is dispersed by a disperser such as a double-roll mill, a triple-roll mill, a kneader or a planetary mixer, any one of which is suitable for substances with high viscosity. The thickener is, however, not so low in viscosity as to be capable of being mixed effectively by a disperser such as a bead mill, a sand mill or a homogenizer, any one of which is suitable for substances with low viscosity. Inefficient dispersion causes not only time-dependent instability but also lot-to-lot instability in viscosity and uniformity.

The ink follower for the water-base ballpoint pens consists of materials similar to the lubricant grease, and exhibits time-dependent behaviors based on similar physical laws.

Once the oil is separated due to a time-dependent change, it affects the surfactant in the ink. It weakens the effect of the ink in the surfactant and blocks the ink passage as oil droplets resulting in a bad influence on writing.

Moreover, if the thickener component in the ink follower lacks homogeneity, the ink follower is separated into a portion following the ink and portions adhering to the inner wall of the ink reservoir. The adhering portions not only give the pen an unpleasant appearance, but also mean a corresponding loss of the ink follower, resulting eventually in its failure to perform its function of, for example, preventing the ink from volatilizing or from leaking.

The objects of this invention are to dissolve the defect that conventional ink follower for a water-base ballpoint pen has lot-to-lot and time-dependent instability of quality, and to provide a method for manufacturing the ink follower which has a better following property than the conventional ink follower for water-base ballpoint pens.

DISCLOSURE OF THE INVENTION

As a result of our diligent study of above problems, we have found that, reduced viscosity and surface tension of the base oil under elevated temperature make it easy for particulate thickener such as silica, alumina and titanium oxide and clay thickener to disperse. We have also found that thickener, when homogenized very highly microscopically, always shows its best performance and that it produces increased time-dependent stability and reduced lot-to-lot difference. Thus we have completed our present invention.

Lubricant grease and ink follower for a water-base ballpoint pen are prepared from similar materials by similar processes, but are clearly different from each other from a technical standpoint.

The lubricant grease is usually used only for lubricating, and is, therefore, made to have high structural viscosity and yield value lest the oily constituent of the grease drip from a point where the grease is applied. On the other hand, the ink follower for a water-base ballpoint pen is held in a reservoir with no opening except its rear end, and is used in an environment in which there is no sliding matter except itself. Therefore, the structural viscosity and yield value of the ink follower may be low. It would rather be correct to say that it is necessary for the ink follower to be low in structural viscosity and yield value in order to follow the ink smoothly.

Fine particulate powder such as inorganic thickener (particulate silica, alumina or titanium dioxide), inorganic or organic pigment and fine resin particulate, which gains structural viscosity in liquid, generally shows a lower thickening effect and a lower yield value when it is well-dispersed.

The solvent used for the base oil for the ink follower is selected from polybutenes, liquid paraffin, highly purified mineral oil such as spindle oil, silicone oil such as dimethyl polysiloxane and methyl phenyl polysiloxane and so on. They do not dissolve in a water-base ink, and has only a small volatile loss. They generally have a better wetting property with resins such as polypropylene, polyethylene and so on, used for an ink reservoir than that of water-base ink. Thus the consumption of the ink is easy to recognize.

Polybutenes and silicone oils, though some kinds of them are highly volatile, can withstand for two years or more at room temperature if their volatile loss is not more than about 0.2% by weight under a JIS C-2320 method at 98° C. for five hours.

The volatility of polybutenes largely depends upon their molecular weight. Polybutenes with average molecular weight more than about 500 may satisfy the above volatile loss.

Since the volatile loss of silicone oils also depends upon their molecular structure, it cannot be determined only by their molecular weight. Therefore, the volatile loss of silicone oils is recommended to be measured practically by the method as described above.

Aerozyl R-972, R-974D, R-976D and RY-200 (trade names, Nippon Aerozyl) are preferable material for the thickener for the present invention. They may be used either solely or jointly and the total additional amount to the total amount of the ink follower is 1–10% by weight.

Although pseudo-plasticity can be given even when the amount is less than 1%, quantitative lack of the thickener is evident and separation of oil cannot be prevented. In addition, even if viscosity is increased using particulate silica, titanium oxide or aluminum as well as other powder such as inorganic and organic pigment whose BET specific surface area is around 50 $m^2$/cm, to which pseudo-plasticity is most unlikely given, the pseudo-plasticity and the yield value at the amount more than 10% become so strong that the following property to ink becomes bad.

A more preferable range is 2–6% by weight to the total amount of the ink follower. Within such a range of additional amount, it is possible to prevent the oil separation and also to ensure a good following property to ink.

Hydrophilic thickener, such as Aerozyl #200, 380, 300, 100 and OX50 (Nippon Aerozyl Co., Ltd.), particulate alumina and ultra-particulate titanium dioxide, both of which are manufactured by a gaseous phase method of the same company, and the mixture of these materials can be prevented from interfering with the ink when the ink follower contains the substances such as surfactant, silane coupling agent, fluorocarbon, and methylhydrogen silicone, each of which has a hydrophilic-lipophilic balance (HLB) value of less than 4, preferably of less than 2. When silicone oil is used the for base oil of the ink follower, it is often possible for the ink follower, without adding other substance, to avoid interfering with the ink.

It is effective to use additive such as surfactant to the ink follower in order to improve its property of following the ink.

Even irrespective of the kind of surfactant, it is not preferable to use the surfactant that dissolves in the ink during storage, but preferable to use nonionic surfactant with an HLB value less than 4. Moreover, the so-called fluorine-surfactant and silicone-surfactant are the most preferable additives since they can drastically lower the surface tension of the base oil.

It is also preferable for the object of this invention to add above-mentioned silane coupling agent, methylhydrogen silicone, etc. since they are effective for stabilization of the dispersion of the thickener, homogenization and hydrophobization. It is very preferable to use additives unless it makes an ill effect for the stability of the ink follower and for the quality of the ink.

The amount of these additives to be used is generally from 0.01%, which is minimal effective concentration, to about 5% by weight. The amount over 5% by weight does not produce any better result, though it may not present any problem in quality.

More preferred range is 0.1–1% by weight. Surfactant acts on the "surface" as its name shows and, therefore, the effect does not increase even if it is added too excessively. Rather, even when surfactant having very strong hydrophobicity is used, there are components having lipophilic groups in the ink and a bad influence may be resulted in view of a property of the pen as a whole. Therefore, too much use is not recommended in terms of stability with a lapse of time. According to the experiences of the present inventors, even in the case of a surfactant having an excellent characteristic property when used as base oil such as polyether-modified silicone, there was no change in terms of property when its amount was more than 1%. In addition, there are some cases where the effect of surfactant becomes weak time-dependently due to decomposition or the like. When such cases are taken into consideration, it is questionable to make its amount to a minimum extent even if that is effective. From our experiences, there was no case where the effect of the surfactant was lost time-dependently when 0.1% or more was added.

Since the present invention includes a method for manufacturing, it will be illustrated in detail by way of Examples. Conceptionally, it is characterized in that the temperature is made higher than ambient temperature in a part of or most of the manufacturing processes whereby base oil and thickener are made compatible.

The temperature applied in the present invention is any temperature between 40° C. and 130° C.

It is quite rare in Japan that, even in the midsummer, ambient temperature exceeds 40° C. Even when the ambieat temperature becomes greatly higher than 40° C., it is still rare throughout the year that the temperature of the materials placed in a room becomes 40° C. or higher. Thus, application of the temperature of 40° C. or higher intentionally means the seasonal variation of the temperature during the manufacture is absorbed and, at the temperature lower than, 40° C., the seasonal variation is unable to be absorbed unless intentional refrigeration is conducted. Although such intentional refrigeration contributes to a reduction in lot-to-lot difference, which is one of the objects of the present invention, that is contrary to the main object of the present invention that thickener is apt to be dispersed homogeneously by means of heating.

Temperature of 130° C. means an upper limit of common steam heating. There are many heating methods such as electric heating and a direct fire and, although the heating method itself is out of question in the present invention, we have concluded that steam heating is the safest and simplest method.

Homogenization of ink follower was not affected even if heating was done at 130° C. or higher. Rather, there were many cases where the low molecular components of the base oil or, in other words, the parts which were apt to be volatile were evaporated whereby the dispersion in the components for each lot of the base oil is apt to reflect the dispersion in the quality of the ink follower. In addition, some of additives such as surfactant are denatured at around 100° C. although that may vary depending upon the heating time and, accordingly, excessive heating is not preferred.

Under an atmosphere of ordinary pressure, more preferred temperature range intended in the present invention is from 100° C. to 130° C. when thickener in fine particles is used while, when clay thickener is used, heating at not higher than 60° C. or non-heating is preferred before the dispersing step such as by a triple-roll mill because of the use of a low molecular alcohol for swelling the clay thickener. After that, the temperature may be from 60° C. to 130° C.

Powder of inorganic particulates and clay thickener as well as other materials absorb moisture,in air during storage but, since the moisture can be removed by heating at 100° C. or higher, quality is more stabilized when a step of 100° C. or higher is included.

Low molecular alcohol with a carbon number about one to four is used as auxiliary agent in the case of clay thickener. Although this auxiliary agent is evaporated and removed finally, it should be present until the step where the shearing force is applied mostly strongly and the total system is to be kept at 60° C. or lower.

When the auxiliary agent is completely evaporated, heating at 100° C. or higher is preferred for excluding the moisture in the material but, if the auxiliary agent remains, it is preferred that the auxiliary agent is gradually evaporated at around 60° C.–80° C.

When a rapid heating is carried out, the auxiliary agent is boiled whereby the dispersed system which is expressly homogenized may be damaged.

The above-mentioned temperature range is not preferred when the ink follower is subjected to a debubbling treatment in a reduced atmosphere. This is because low molecular components and additives in the base oil are evaporated therefrom.

The temperature may also vary depending upon the degree of vacuation and is preferably 60° C. or lower when vacuated to an extent of about 0.1 atm (10 kPa) or lower.

The essential object of the present(invention is that viscosity and surface tension of the base oil are reduced by raising the temperature whereby thickener and base oil are made compatible. Accordingly, it is preferred to heat at 60° C. or higher even in the process for manufacturing ink follower including a vacuating step. Even in such a case, however, it is still preferred to cool at 60° C. or lower followed by vacuating.

Another example where application of temperature is effective is a step for diluting the concentrated dispersion.

In a method for a homogeneous dispersing of the powder of inorganic particulates and the clay thickener, a disperser for high viscosity such as a double-roll mill, a triple-roll miller, a kneader and a planetary mixer is used. In such a machine, substance of higher viscosity is more efficiently dispersed. Therefore, there may be the cases where all of the substrate components are not added initially but the components are dispersed in high concentrations, or where only highly viscous components in the base oil components are dispersed and then the residual base oil components are added thereto to dilute.

In such cases, activity of the base oil components is higher and a more homogeneous mixing is resulted when the temperature of the base oil components which are added later is raised to 40° C. or higher and then added. It is still better that the addition is not conducted at a time but is done for several times little by little with stirring whereby a homogeneous state is resulted within shorter time as a result.

An example for a method of filling the ink follower of the present invention is that the ink is filled in an ink reservoir, a pen point is attached and then ink follower is charged. After that, a strong centrifugal force is applied by means of a centrifugal separator in the direction of from the tail end to the pen point whereby the ink follower is filled with a good appearance containing no air or the like between the ink and the ink follower.

BEST MODE FOR CARRYING OUT THE INVENTION

Figure 1:
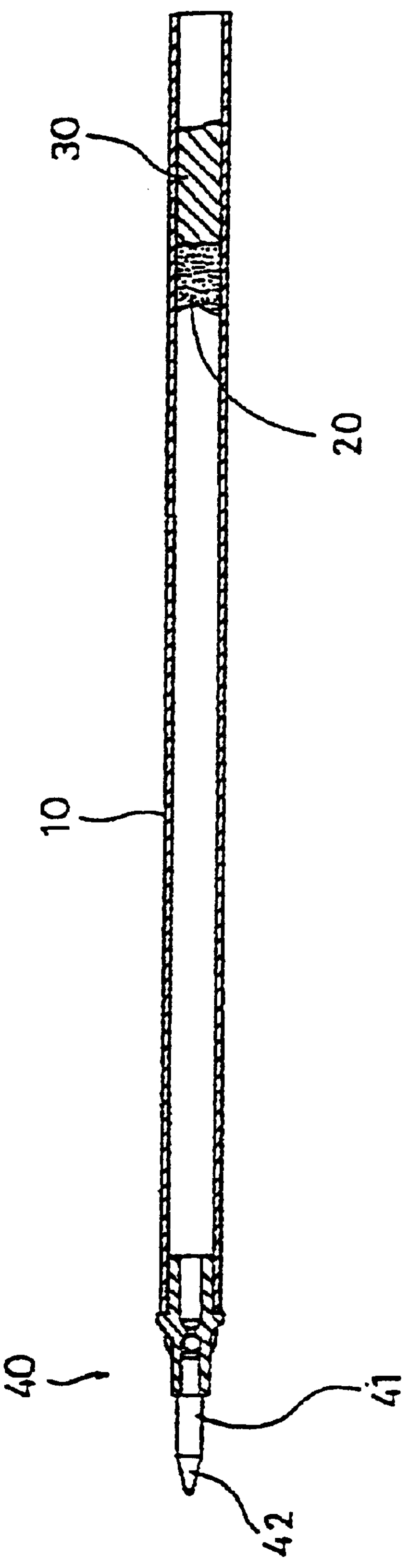
FIG. 1 is a cross-section showing a holder of a water-base ballpoint pen using the ink follower manufactured by a method of the present invention.

The present invention will now be further illustrated by way of following Examples and Comparative Examples.

For the assembly of the ballpoint pen used in Test 3 and Test 4, a centrifugal separator of type H-103N manufactured by Kokusan Enshinki Co., Ltd. was used and a centrifugal force was applied at 2800 rpm for 10 minutes so as to apply the centrifugal force in a direction of from the tail end of the pen to the pen tip whereby the bubbles contaminated inside are eliminated.

The ink for a water-base ballpoint pen for Test 3 and Test 4 was prepared as follows.

| | |
|---|---|
| Printex 25 (Carbon black; trade name of Degussa) | 7 parts by weight |
| PVP K-30 (Polyvinylpyrrolidone; manufactured by GAF) | 3.5 parts by weight |
| Glycerol | 10 parts by weight |
| Potassium ricinolate | 0.5 part by weight |
| Triethanolamine | 1 part by weight |
| 1,2-Benzisothiazolin-3-one | 0.2 part by weight |
| Benzotriazole | 0.2 part by weight |
| Water | 27.2 parts by weight |

The above components were kneaded by a beadmill. After that, coarse particles of carbon black were removed and then

| | |
|---|---|
| Propylene glycol | 20 parts by weight |
| Carbopol 940 (Polyacrylic acid of a cross-linked type; trade name of B.F. Goodrich) and | 0.4 part by weight |
| Water | 30 parts by weight |

were added thereto. Finally, ink having a viscosity of 500 mPa sec at 40 sec-$^{-1}$ for a water-base ballpoint pen was prepared.

Each five lots of the following Examples and Comparative Example were prepared using the materials of the same lot. "MW=" for polybutene means its molecular weight. Unless otherwise mentioned, viscosity was measured at 25° C. using a viscometer of type E manufactured by Toki Sangyo (using a 3° cone).

The material used was that which was allowed to stand at room temperature (10° C.–25° C.) unless otherwise mentioned.

Test 1. Viscosity Difference

Viscosity of the ink follower of the Examples and the Comparative Examples was measured. The viscosity was expressed as a ratio (in terms of %) of the maximum value to the minimum value among the five values of viscosity which was measured for one rotation at a cone angle of 3° using a viscometer of type E. The less the value is (the nearer to 100 the value is), the smaller the difference is.

Test 2. Time-Dependent Stability-1 (Bubbling Test)

Ten ballpoint pen holders shown in FIG. 1 for each lot of Examples 1–12 and Comparative Examples 1–8 (in other words, 50 pens for each Example or Comparative Example) were assembled and left upward in a water bath of 35° C. for a month. The number of the product where bubbles were seen in the ink or at the interface between the ink and the ink follower was counted. The less the number is, the more preferable the result is.

For common grease, its test method for degree of oil separation is regulated in JIS K2220-5.7. As mentioned above, however, both object for use and aimed: viscotenacity and viscoelasticity are entirely different between the common grease and the ink follower. Therefore, in the test according to the said test method, the ink follower leaks out keeping the viscotenacity whereby the test is unable to be carried out. Accordingly, in the present invention, the test was empirically substituted with the Test 3.

Test 3. Time-Dependent Stability-2 (Oil Separation Test)

Ten ballpoint pen holders as shown in FIG. 1 were assembled for each of the five lots of the products of the Examples and the Comparative Examples.

A semi-transparent polypropylene tube having an inner diameter of 4.0 mm was used as an ink reservoir (10) of the ballpoint pen holder (40) and ink (20) and ink follower (30) of each of the Examples and the Comparative Examples were filled therein. The pen point was equipped with a ball pen tip which was the same as that for a commercially available ballpoint pen (UM-100; trade name of Mitsubishi Pencil Co., Ltd.) as shown in FIG. 1. The material for the ballpoint pen tip holder (41) was a free-cutting stainless steel while the ball (42) was made of a tungsten carbide having a diameter of 0.5 mm.

The ballpoint pen equipped with the assembled holder (not shown) was allowed to stand in a water bath of 50° C. for a month in such a state that the pen point was left upward and the numbers of the pens in which the oil was mixed with the ink were counted visually and were used as the points. There were ten pens for each lot and there were five lots for each Example or Comparative Example and, therefore, each Example or Comparative Example consisted of fifty samples whereby zero point was the best while fifty points was the worst.

Test 4. Time-Dependent Stability-3 (Writing Test After Preservation)

The same numbers of samples as in Test 3 were assembled and subjected to a spiral writing at the rate of 4.5 m/sec to observe the ink follower. When the ink follower rarely adhered to the inner wall of the ink reservoir and followed at the amount of about 18 mm or longer to the end of the test, the point was 5; when the amount was 10–18 mm, the point was 3; when it was 3–10 mm, the point was 1; and when it was 3 mm or less, the point was 0. Then four products for each lot or, in other words, 20 for each example were totaled. The top grade was 100 points while the lowest was 0 point and the higher the point was, the better the result was.

Now, the Examples and the Comparative Examples for the ink follower used in the above experiments will be illustrated as hereunder.

The Examples and the Comparative Examples were classified into groups I–V for each comparison and the evaluation was conducted relatively in each group.

Group I

EXAMPLE 1

| | |
|---|---|
| Polybutene 100H (trade name of Idemitsu Kosan Co., Ltd.; MW = 960; viscosity: 19 Pa sec) | 47.4 parts by weight |
| Aerozyl R-976D (hydrophobic silica; trade name of Nippon Aerozyl Co., Ltd.) | 5 parts by weight |
| Eftop EF-801 (fluorine surfactant; trade name of Mitsubishi Material Co., Ltd.) | 0.1 part by weight |

The above compounded substance was kneaded at ambient temperature for an hour using a planetary mixer (manufactured by Dalton Co., Ltd.; type 5DMV; equipped with an electric heater) to give a viscous gel-like substance 1A. After that,

| | |
|---|---|
| Gel-like substance 1A | 52.5 parts by weight |
| and | |
| Diana process oil MC-S32 (mineral oil; trade name of Idemitsu Kosan Co., Ltd.) | 47.5 parts by weight |

were weighted and stirred at 120° C. for 30 minutes to give a product of Example 1.

EXAMPLE 2

The same compounded substance as in Example 1 was treated with the same planetary mixer by kneading at 100° C. to give a gel-like substance 2A. After that,

| | |
|---|---|
| Gel-like substance 2A | 52.5 parts by weight |
| and | |
| Diana process oil MC-S32 | 47.5 parts by weight |

were weighed and stirred at 120° C. for 30 minutes to give a product of Example 2.

EXAMPLE 3

| | |
|---|---|
| Gel-like substance 2A | 52.5 parts by weight |
| and | |
| Diana process oil MC-S32 | 47.5 parts by weight |

were weighed and stirred at ambient temperature for 30 minutes to give a product of Example 3.

Comparative Example 1

| | |
|---|---|
| Gel-like substance 1A | 52.5 parts by weight |
| and | |
| Diana process oil MC-S32 | 47.5 parts by weight |

were stirred at ambient temperature for 30 minutes using a planetary mixer (mentioned above) to give a product of Comparative Example 1.

Comparative Example 2

The same compounded substance as in Example 1 was treated with the same planetary mixer by kneading at 140° C. to give a gel-like substance 2B. After that,

| | |
|---|---|
| Gel-like substance 2B | 52.5 parts by weight |
| and | |
| Diana process oil MCS32 | 47.5 parts by weight |

were weighed and stirred at 140° C. for 30 minutes to give a product of Comparative Example 2.

This group I was summarized and is shown in Table 1. Incidentally, unit of the temperature is ° C. while that of the time is minute(s).

TABLE 1

| Group I | | | | |
|---|---|---|---|---|
| | Planetary Mixer | | Stirring | |
| | Temperature | Time | Temperature | Time |
| Example 1 | room temp | 60 | 120 | 60 |
| Example 2 | 100 | 60 | 120 | 30 |
| Example 3 | 100 | 60 | room temp | 30 |
| Comp. Ex. 1 | room temp | 60 | room temp | 30 |
| Comp. Ex. 2 | 140 | 60 | 140 | 30 |

Group II

EXAMPLE 4

| | |
|---|---|
| Nissan polybutene 0.15N (tradename of NOF Co., Ltd.; MW = 580) | 95 parts by weight |
| Aerozyl R-974D (hydrophobic silica; trade name of Nippon Aerozyl Co., Ltd.) | 4 parts by weight |
| KBM 504 (silane coupling agent; trade name of Shin-Etsu Chemical Co., Ltd.) | 1 part by weight |

They were kneaded for an hour using a planetary mixer (mentioned above) heated at 130° C. to give a product; of Example 4.

EXAMPLE 5

The same compounded substance as in Example 4 was kneaded for an hour using a planetary mixer (mentioned above) heated at 40° C. to give a product of Example 5.

Comparative Example 3

The same compounded substance as in Example 4 was kneaded for an hour using a planetary mixer (mentioned above) kept at ambient temperature to give a product of Comparative Example 3.

Comparative Example 4

The same compounded substance as in Example 4 was kneaded for an hour using a planetary mixer (mentioned above) heated at 150° C. to give a product of. Comparative Example 4.

This group II was summarized and is shown in Table 2. Incidentally, unit of the temperature is ° C. while that of the time is minute(s).

TABLE 2

| Group II | | |
|---|---|---|
| | Planetary Mixer | |
| | Temperature | Time |
| Example 4 | 130 | 60 |
| Example 5 | 40 | 60 |
| Comp. Ex. 3 | room temp | 60 |
| Comp. Ex. 4 | 150 | 60 |

Group III

EXAMPLE 6

| | |
|---|---|
| Nissan polybutene 200SH (trade name of NOF Co., Ltd.; MW = 2650) | 48.9 parts by weight |
| Aerozyl R-972 (hydrophobic silica; trade name of Nippon Aerozyl Co., Ltd.) | 3 parts by weight |
| Silwet FZ-2122 (silicone surfactant; trade name of Nippon Unicar Co., Ltd.) | 0.1 part by weight |

The above compounded substance was kneaded once by a triple-roll mill (manufactured by Kodaira Seisakusho; 13 cm roll) where the roll surface was heated at 40° C. by steam to give a gel-like substance 6A. After that,

| | |
|---|---|
| Gel-like substance 6A | 52.0 parts by weight |
| and | |
| KF 54 (methyl phenyl silicone oil; trade name of Shin-Etsu Chemical Co., Ltd.) | 48.0 parts by weight |

were weighed in a mixing kneader (manufactured by Tokushu Kika Kogyo Co., Ltd.; type HM-2P) and kneaded at 40° C. for an hour to give a product of Example 6.

EXAMPLE 7

| | |
|---|---|
| Gel-like product 6A | 52.0 parts by weight |
| and | |
| KF-54 | 48.0 parts by weight |

were kneaded at 120° C. for an hour using the same apparatus as in Example 6 to give a product of Example 7.

EXAMPLE 8

The same compounded substance as for the gel-like product 6A of Example 6 was kneaded once using a triple-roll mill (mentioned above) where the temperature of the roll surface was made 120° C. to give a gel-like product 8A. After that,

| | |
|---|---|
| Gel-like product 8A | 52.0 parts by weight |
| and | |
| KF 54 | 48.0 parts by weight |

were weighed in the mixing kneader (mentioned above) and kneaded at 120° C. for an hour to give a product of Example 8.

EXAMPLE 9

The same compounded substance as for the gel-like product 6A of Example 6 was kneaded once using a triple-roll mill (mentioned above) kept at ambient temperature to give a gel-like product 9A. After that,

| | |
|---|---|
| Gel-like product 9A<br>and | 52.0 parts by weight |
| KF 54 | 48.0 parts by weight |

were weighed in the mixing kneader (mentioned above) and kneaded at 120° C. for an hour to give a product of Example 9.

Comparative Example 5

| | |
|---|---|
| Gel-like product 6A<br>and | 52.0 parts by weight |
| KF-54 | 48.0 parts by weight |

were kneaded at 140° C. for one hour using the same apparatus as in Example 6 to give a product of Comparative Example 5.

Comparative Example 6

The same compounded substance as for the gel-like product 6A of Example 6 was kneaded once using a triple-roll mill (mentioned above) where the temperature of the roll surface was made 140° C. to give a gel-like product 6B. After that,

| | |
|---|---|
| Gel-like product 6B<br>and | 52.0 parts by weight |
| KF 54 | 48.0 parts by weight |

were weighed in the mixing kneader (mentioned above) and kneaded at 120° C. for one hour to give a product of Comparative Example 6.

This group III was summarized and is shown in Table 3. Incidentally, unit of the temperature is ° C. while that of the time is minute(s).

TABLE 3

| | Group III | | | |
|---|---|---|---|---|
| | Roll Mill | | Kneading | |
| | Temperature | Frequency | Temperature | Time |
| Example 6 | 40 | once | 40 | 60 |
| Example 7 | 40 | once | 120 | 60 |
| Example 8 | 120 | once | 120 | 60 |
| Example 9 | room temp | once | 120 | 60 |
| Comp. Ex. 5 | 40 | once | 140 | 60 |
| Comp. Ex. 6 | 140 | once | 120 | 60 |

Group IV

EXAMPLE 10

| | |
|---|---|
| KF96H<br>(dimethyl silicone oil; trade name of Shin-Etsu Chemical Co., Ltd.; viscosity = 10 Pa sec) | 36 part(s) by weight |
| Aerozyl #200 (fine particles of silica; trade name of Nippon Aerozyl Co., Ltd.) | 3 parts by weight |
| TSF 484 (methyl hydrogen silicone; trade name of Toshiba Silicone Co., Ltd.) | 1 part by weight |

They were preliminarily kneaded at 120° C. for 30 minutes using a planetary mixer (mentioned above) and then kneaded twice using a triple-roll mill (mentioned above) at room temperature to give a gel-like product 10A. Then,

| | |
|---|---|
| Gel-like product 10A<br>and | 40 parts by weight |
| KF54 | 60 parts by weight |

were weighed in a planetary mixer (mentioned above) and stirred at ambient temperature for 30 minutes to give a product of Example 10.

EXAMPLE 11

The same compounded substance for the gel-like product 10A of Example 10 was preliminarily kneaded at 40° C. for 30 minutes and then kneaded twice at room temperature using a triple-roll mixer (mentioned above) to give a gel-like product 11A. Then,

| | |
|---|---|
| Gel-like product 11A<br>and | 40 parts by weight |
| KF54 | 60 parts by weight |

were weighed in a planetary mixer (mentioned above) and stirred at ambient temperature for 30 minutes to igive a product of Example 11.

Comparative Example 7

The same compounded substance for the gel-like product 10of Example 10 was preliminarily kneaded at room temperature for 30 minutes and then kneaded twice at room temperature using a triple-roll mixer (mentioned above) to give a gel-like product 7B. Then,

| | |
|---|---|
| Gel-like product 7B<br>and | 40 parts by weight |
| KF54 | 60 parts by weight |

were weighed in a planetary mixer (mentioned above) and stirred at ambient temperature for 30 minutes to give a product of Comparative Example 7.

This group IV was summarized and is shown in Table 4. Incidentally, unit of the temperature is ° C. while that of the time is minute(s).

TABLE 4

| | Group IV | | | | | |
|---|---|---|---|---|---|---|
| | Preliminary Kneading | | Roll Mill | | Stirring | |
| | Temperature | Time | Temperature | Frequency | Temperature | Time |
| Example 10 | 120 | 30 | room temp | 2 | room temp | 30 |
| Example 11 | 40 | 30 | room temp | 2 | room temp | 30 |
| Comp. Ex. 7 | room temp | 30 | room temp | 2 | room temp | 30 |

Group V

EXAMPLE 12

| | |
|---|---|
| Nissan polybutene 200SH | 36.5 parts by weight |
| Benton 34 (organically treated bentonite; trade name of Wilber-Ellis) | 3 parts by weight |
| Diglycerol dibehenyl ether | 0.5 part by weight |
| KBM 504 | 0.5 part by weight |
| Ethanol | 1 part by weight |
| Diana process oil MC-S32 | 58.5 parts by weight |

The above compounded substance was preliminarily stirred for 30 minutes(at ambient temperature) using a beaker made of stainless steel, kneaded twice using a triple-roll mill (at ambient temperature) and kneaded for one hour using a planetary mixer (mentioned above) wherein the inner area was at 60° C. and about 0.1 atm to give a product of Example 12. Ethanol was evaporated and lost until completion of a treatment with the triple-roll mill.

Comparative Example 8

The same compounded substance as in Example 12 was preliminarily stirred for 30 minutes using a beaker made of stainless steel of 120° C., kneaded twice using a triple-roll mill (at ambient temperature) and kneaded for one hour using a planetary mixer (mentioned above) wherein the inner area was at 60° C. and about 0.1 atm to give a product of Comparative Example 8. Ethanol was evaporated and lost until completion of a treatment with the triple-roll mill.

This group V was summarized and is shown in Table 5.

Incidentally, unit of the temperature is ° C. while that of the time is minute(s).

TABLE 5

| | Group V | | | | | |
|---|---|---|---|---|---|---|
| | Preliminary Stirring | | Roll Mill | | Planetary mixer | |
| | Temperature | Time | Temperature | Frequency | Temperature | Time |
| Example 12 | room temp | 30 | room temp | 2 | 60 | 60 |
| Comp. Ex. 8 | 120 | 30 | room temp | 2 | 60 | 60 |

Results of evaluation for each of those Examples and Comparative Examples are shown in Table 6.

TABLE 6

| Group | Sample Name | Test 1 | Test 2 | Test 3 | Test 4 |
|---|---|---|---|---|---|
| I | Example 1 | 112 | 4 | 0 | 88 |
| | Example 2 | 110 | 2 | 0 | 88 |
| | Example 3 | 115 | 1 | 0 | 70 |
| | Comp. Ex. 1 | 128 | 15 | 2 | 60 |
| | Comp. Ex. 2 | 131 | 16 | 5 | 60 |
| II | Example 4 | 120 | 0 | 0 | 72 |
| | Example 5 | 121 | 6 | 2 | 60 |
| | Comp. Ex. 3 | 133 | 17 | 12 | 20 |
| | Comp. Ex. 4 | 151 | 0 | 0 | 52 |
| III | Example 6 | 111 | 8 | 0 | 90 |
| | Example 7 | 109 | 0 | 0 | 100 |
| | Example 8 | 105 | 0 | 0 | 100 |
| | Example 9 | 107 | 0 | 0 | 100 |
| | Comp. Ex. 5 | 142 | 0 | 0 | 90 |
| | Comp. Ex. 6 | 161 | 0 | 0 | 90 |
| IV | Example 10 | 110 | 2 | 0 | 98 |
| | Example 11 | 111 | 6 | 0 | 82 |
| | Comp. Ex. 7 | 125 | 10 | 15 | 60 |
| V | Example 12 | 123 | 0 | 0 | 100 |
| | Comp. Ex. 8 | 223 | 45 | 28 | 40 |

Viscosity difference in Test 1 varies depending upon the compounding and also on a disperser and, therefore, a relative comparison was carried out for each group.

About Group I

In Example 1, the temperature reached 120° C. upon stirring; in Example 3, it reached 100° C. upon kneading by a planetary mixer; and, in Example 2, it reached 100° C. upon kneading with a planetary mixer while, upon stirring, it reached 120° C. Among them, a higher evaluation was resulted in Example 2 as compared with Example 1 or 3.

Further, the evaluation for the product which was treated only at room temperature as in Comparative Example 1 was low. This is because, when the treatment was at room temperature, homogenization of the thickener was not fully achieved due to too low temperature. The evaluation was also low for the case where the temperature was raised to 140° C. as in Comparative Example 2. This is because: there is a boundary at 130° C. and, when the temperature is higher than that, viscosity difference probably due to evaporation becomes big. Incidentally, the difference at room temperature was big presumably because the test period was from February to May.

About Group II

Again, a higher evaluation was noted for Example 4 where the temperature was 130° C. as compared with Example 5 where the temperature was 40° C.

The difference in temperature versus the difference in evaluation as noted in Example 4 and Example 5 as such is due to the fact that, although moisture in the air was absorbed with the power of inorganic particulates and the clay thickener as well as other materials during preservation, it was able to be removed by heating at 100° C. or higher whereby the evaluation of Example 4 including a step of higher than 100° C. was higher.

In addition, due to the same reason as in Group I, evaluations for Comparative Example 3 and Comparative Example 4 were low.

About Group III

Again, as compared with Example 6 where both of the temperature upon the use of a roll mill and that upon kneading were 40° C., higher evaluations were noted for Example 7 and Example 9 where the temperature upon kneading was 120° C. Further, the evaluation was far higher in the case of Example 8 where both of the above were 120° C. The difference in temperature versus the difference in evaluation as such is due to the fact that, although moisture in the air was absorbed with the power of inorganic fine particles and the clay thickener as well as other materials during preservation, it was able to be removed by heating at 100° C. or higher whereby the evaluations of Examples 7, 8 and 9 including a step of higher than 100° C. were higher.

On the contrary, the evaluations were lower in Comparative Example 6 where the temperature upon the use of the roll mill was 140° C. and in Comparative Example 5 where the temperature upon kneading was 140° C. This is because there is a boundary at 130° C. and, when the temperature was higher than that, viscosity difference presumably ;due to evaporation became big.

About Group IV

In this Group, although the use of the roll mill and the stirring were carried out at room temperature, there was a difference in the temperature upon a preliminary kneading before them.

To be more specific, as compared with Comparative Example 7 where the preliminary kneading was also carried out at room temperature, higher evaluations were resulted in Example 11 where the preliminary kneading was carried out at 40° C. and in Example 10 where that was carried out at 120° C.

It is therefore likely again that dispersibility of the thickener improved when a preliminary kneading was carried out at higher temperature.

About Group V

In Group V, after a preliminary stirring was carried out, a roll mill was used and then a planetary mixer was used.

Here, evaluation for Example 12 where the preliminary stirring and the use of the roll mill were conducted at room temperature and the planetary mixer was used at 60° C. was high.

On the contrary, evaluation for Comparative Example 8 where the preliminary stirring was conducted at 120° C. was low.

This is because, since the temperature of 120° C. was applied before the dispersing step where the highest shearing force was applied, ethanol which is an auxiliary agent for swelling the clay thickener was evaporated whereby dispersions became big in all of the properties. Thus, since the temperature was made high prior to "a step for homogenizing thickener" according to the present invention, the evaluation became low.

There was a tendency that, in a bubbling test of Test 2, when stirring was carried out at higher temperature, the result was more advantageous. This is because, during the stirring at high temperature, the base oil was wetted even to an extent of the invisible bubbles remaining in the thickener.

The bubbling property was also good in the case where the temperature was higher than 130° C.

The same character was noted in the oil separation test of Test 3 and in the following property test of Test 4. Thus, when the dispersibility of the thickener was good, the oil was hardly oozed out and, in addition, showed a good following property.

Exceptionally, in Comparative Example 4, the following property was not so good in spite of the fact that no oil was oozed out. This is because, although there was no problems for heat resistance of methyl hydrogen silicone which was an additive, a low molecular polybutene having a relatively low molecular weight (580 in average) was evaporated whereby viscosity of the base oil became high and, in addition, amount of the thickener increased relatively.

The same tendency as in the Examples of the present application was noted in the tests for reference where the followings were optionally combined:

Base oil: polybutene, liquid paraffin, spindle oil, dimethyl silicone oil and methyl phenyl silicone oil;

Thickener: Aerozyl R-972, R-974D, R-976D, RY-200, #200, 380, 300, 100, OX50, Titanium Dioxide P25 and Aluminium Oxide (trade names of Nippon Aerozyl Co., Ltd.), Benton 27, 34 and EW (trade names of Wilber-Ellis), synthetic smectite SAN, SAF and SWN (trade names of Cope Chemical) or the like; and Additive: surfactant such as fluorine surfactant, silicone surfactant, polyoxyethylene derivatives, glycerol-polyglycerol derivatives, sorbitan derivatives and phosphates silane coupling agent, aluminum coupling agent and titanium coupling agent.

As mentioned above, the method for manufacturing ink follower for a water-base ballpoint pen in accordance with the present invention is an excellent method, which is stable time-dependently, where the dispersibility of thickener is constant for every lot resulting in little viscosity difference and where fine bubbles existing in the thickener in the ink follower are removed resulting in prevention of bubble generation in a ballpoint pen holder during preservation.

Industrial Applicability

A method for manufacturing the ink follower for a water-base ballpoint pen in accordance with the present invention is utilized for manufacturing ink follower placed at the tail end part of ink received in an ink reservoir of a water-base ballpoint pen.

What is claimed is:

1. A method for manufacturing an ink follower for a water-base ballpoint pen at least consisting of a mixture of nonvolatile or hardly-volatile organic solvent and particulate thickener or clay thickener, comprising a plurality of steps in which the mixture of the solvent and the thickener is homogenized, at least one of said plurality of steps including a step of homogenization of the mixture at a temperature within a range of 60° C. to 130° C., with the provisos that:

a first step of homogenization does not include stirring with heating, and the mixture is never heated over 130° C. in any step of homogenization.

2. A method for manufacturing an ink follower for a water-base ballpoint pen according to claim 1, wherein the mixture is either stirred, kneaded or dispersed in each of the steps of homogenization, with the proviso that stirring in the first step of homogenization is without heating; and the ink follower comprises:

a solvent or mixture of solvents selected from the group consisting of polybutene, liquid paraffin, highly purified mineral oil and hardly-volatile silicone oil; and one or more thickeners selected from the group consisting of inorganic particulate thickener, lipophilized natural smectite clay thickener and lipophilized synthetic smectite clay thickener.

3. A method for manufacturing an ink follower for a water-base ballpoint pen according to claim 2, wherein the highly purified mineral oil is spindle oil;

the inorganic particulate thickener is selected from the group consisting of silica, alumina and titanium oxide; and the smectite clay thickener is lipophilized by an onium treatment.

4. A method for manufacturing an ink follower for a water-base ballpoint pen at least consisting of nonvolatile or hardly-volatile organic solvent and particulate thickener or clay thickener, comprising a plurality of steps in which the mixture of the solvent and the thickener is homogenized, at least one of said plurality of steps including a step of homogenization of the mixture at a temperature within a range of 100° C. to 130° C., with the provisos that:

a first step of homogenization does not include stirring with heating, and the mixture is never heated over 130° C. in any step of homogenization.

* * * * *